(12) United States Patent
Lee et al.

(10) Patent No.: US 7,260,161 B2
(45) Date of Patent: Aug. 21, 2007

(54) HYBRID MULTI-USER INTERFERENCE CANCELLATION METHOD AND DEVICE USING CLUSTERING ALGORITHM BASED ON DYNAMIC PROGRAMMING

(75) Inventors: Sang-Hyun Lee, Busan (KR); Soo-Jung Jung, Sacheon (KR); Kyung-Hi Chang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 791 days.

(21) Appl. No.: 10/665,085

(22) Filed: Sep. 17, 2003

(65) Prior Publication Data

US 2004/0123227 A1 Jun. 24, 2004

(30) Foreign Application Priority Data

Dec. 24, 2002 (KR) ................ 10-2002-0083122
Feb. 17, 2003 (KR) ................ 10-2003-0009752

(51) Int. Cl.
*H03D 1/04* (2006.01)
(52) U.S. Cl. ................ 375/346; 373/130; 373/148
(58) Field of Classification Search ........ 375/346, 375/130, 147
See application file for complete search history.

(56) References Cited

U.S. PATENT DOCUMENTS

2003/0206577 A1* 11/2003 Liberti et al. ........... 375/152

FOREIGN PATENT DOCUMENTS

| KR | 1020010046119 | 6/2001 |
| KR | 1020010068129 | 7/2001 |
| KR | 1020020073862 | 9/2002 |

OTHER PUBLICATIONS

Ang, "A method of limiting the processing delay of the improved multi-stage variable group hybrid interference cancellation scheme for CDMA systems", VTC 1999—Fall, IEEE VTS 50th Vehicular Technology Conference, 1999. vol. 3, Sep. 19-22, 1999 pp. 1648-1652 vol. 3.*
Sun, "A hybrid interference canceller in CDMA", 1998 IEEE 5th International Symposium on Spread Spectrum Techniques and Applications, 1998, Proceedings, vol. 1, Sep. 2-4, 1998 pp. 150-154 vol. 1.*
Ang "A Novel Variable Group Hybrid Interference Cancellation Scheme for CDMA Systems", ITC'99, Cheju, Jun. 1999.*
Ang, "An Improved Multi-Stage Variable Group Hybrid Multi-User Interference Cancellation Scheme for CDMA Systems", PIRMC'99, Osaka, Japan, Sep. 1999.*

* cited by examiner

*Primary Examiner*—Temesghen Ghebretinsae
*Assistant Examiner*—Juan Alberto Torres
(74) *Attorney, Agent, or Firm*—Blakely Sokoloff Taylor & Zafman

(57) ABSTRACT

Disclosed is a hybrid multi-user interference cancellation method for canceling interference between a plurality of user signals, which comprises: receiving a plurality of external user signals, calculating powers of the user signals, and numbering the calculated signal powers in their intensity orders; sorting the user numbers in descending order; forming at least one user cluster so that the signal powers following the sorted user numbers may differ less from a central value or a mean value in the same cluster; and performing parallel interference cancellation on the respective user signals within the same cluster, and performing successive interference cancellation between the formed clusters.

13 Claims, 6 Drawing Sheets

HYBRID MULTI-USER INTERFERENCE CANCELLATION METHOD AND DEVICE USING CLUSTERING ALGORITHM BASED ON DYNAMIC PROGRAMMING

CROSS REFERENCE TO RELATED APPLICATION

This application is based on Korea Patent Applications No. 2002-83122 filed on Dec. 24, 2002 and No. 2003-9752 filed on Feb. 17, 2003 in the Korean Intellectual Property Office, the content of which is incorporated herein by reference.

BACKGROUND OF THE INVENTION (a) Field of the Invention

The present invention relates to a multi-user detection method for canceling MAI (multiple access interference) caused by usage of a plurality of users in a CDMA (code division multiple access) communication system. More specifically, the present invention relates to a method for configuring a multi-user detector using a hybrid interference cancellation method, and canceling the interference using a clustering method that adopts an optimization method for effective interference cancellation, and a realization thereof.

(b) Description of the Related Art

Spread spectrum CDMA methods, such as IS-95 and IMT-2000, have been used as important multiple access methods in second and third generation mobile communications.

Since direct sequence CDMA among them allows a plurality of users to share time and frequencies, the users are determined using signature share time and frequencies, the users are determined using signature sequences.

However, since complete orthogonality between user signature sequences are not guaranteed, cross-correlation exists between the signature sequences, and the corresponding MAI accordingly restricts transmission capacity and performance of the communication systems. The near-far problem also exists, being generated because of differences of users' signal power.

To solve the above-noted problems, multi-user detection methods for canceling the MAI have been proposed.

An optimal detector following the multi-user detection methods has theoretically been found, but since the methods have a calculation complexity level that is an exponential function of the number of users, they are not appropriate for actual realization. Therefore, studies on quasi-optimal detectors with less calculation complexity and allowing some performance deterioration have been undertaken.

With these quasi-optimal detectors, since the interference canceller differs from the linear detector in that it requires no inverse matrix calculation on the cross-correlation matrix, the interference canceller is easier to realize than the linear detector. The realization method includes the SIC (successive interference cancellation) method and the PIC (parallel interference cancellation) method, depending on the configuration.

The SIC method for arranging the signal powers of all users according to their size, sequentially estimating the signals to regenerate them, and canceling them from received signals, provides excellent BERs (bit error rates), but processing delay time increases in proportion to the number of users.

The PIC method concurrently estimates signals of all users in the earlier step to cancel regenerated signals of users other than the corresponding users from the received signals. This PIC method provides a short processing delay time, but problematically increases calculation complexity since the method uses a multi-stage configuration for better performance.

Also, the PIC device outperforms the SIC device when the power control for solving the fundamental problems is complete, and the SIC device outperforms the PIC device when the power control is not complete.

The Korean Application No. 10-2001-13752, "Multi-user interference cancellation apparatus and method" by LG Electronics, discloses a technique related to the interference cancellation. In this application, by arranging all the multi-user signal powers in descending sequence to cancel the interference, a multi-user interference canceller and a method thereof with somewhat increased calculation but better performance is provided. However, the interference cancellation method increases the processing delay time in proportion to the number of users.

SUMMARY OF THE INVENTION

It is an advantage of the present invention to provide a hybrid multi-user interference cancellation method and device using a clustering method on the dynamic programming basis, for forming at least one cluster so that the difference of each user's received signal power may be reduced, thereby preventing deterioration of the whole detection performance caused by the difference of signal powers.

It is another advantage of the present invention to provide a hybrid multi-user interference cancellation method and device using a clustering method on the dynamic programming basis, for reducing calculation complexity of a cluster configuration unit and an interference canceller, and preventing an additional cost increase (increase in hardware and software expenses).

In one aspect of the present invention, a hybrid multi-user interference cancellation method for canceling interference between a plurality of user signals comprises:

(a) receiving a plurality of external user signals, calculating powers of the user signals, and providing user numbers to the calculated signal powers in their intensity orders;

(b) sorting the user numbers in descending order;

(c) forming at least one user cluster so that the signal powers following the sorted user numbers may differ less from a central value or a mean value in the same cluster; and (d) performing parallel interference cancellation on the respective user signals within the same cluster, and performing successive interference cancellation between the formed clusters.

The (c) comprises:

configuring a trellis including nodes and branches, the sorted user numbers being provided to the nodes; and forming at least one user cluster including at least one user number from a start node to an arrival node moving along the branches of the trellis.

In another aspect of the present invention, a hybrid multi-user interference canceller for canceling interference between a plurality of user signals comprises:

a channel estimator for receiving a plurality of external user signals, calculating powers of the user signals, and numbering the calculated signal powers in their intensity orders;

a sorter for sorting the user numbers in descending order;

a cluster calculator/former for forming at least one user cluster so that the signal powers following the sorted user numbers may differ less from a central value or a mean value in the same cluster; and a hybrid interference canceller for performing parallel interference cancellation on the respective user signals within the same cluster, and performing successive interference cancellation between the formed clusters.

In still another aspect of the present invention, a recording medium including a hybrid multi-user interference cancellation method for canceling interference between a plurality of user signals comprises:

(a) receiving a plurality of external user signals, calculating powers of the user signals, and numbering the calculated signal powers in their intensity orders;

(b) sorting the user numbers in descending order;

(c) forming at least one user cluster so that the signal powers following the sorted user numbers may differ less from a central value or a mean value in the same cluster; and (d) performing parallel interference cancellation on the respective user signals within the same cluster, and performing successive interference cancellation between the formed clusters.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

First, a reverse link in a discrete signal sync direct sequence CDMA system is considered. That is, since all the data of all users are concurrently received through a synchronized channel, signals of different symbol times are statistically independent. Therefore, the reverse link will be considered with respect to one symbol time.

A data modulation method uses the BPSK (binary phase shift keying) mode in the state that the user's signal power is given by an additional channel estimation method. When signals of K users are passed through an AWGN (additive white Gaussian noise) channel, a receive signal sampled per chip symbol is given as Equation 1.

$$r = SWd + n, r \in R^N \quad \text{Equation 1}$$

$$S = (s_1, s_2, \ldots, s_k) \in \left\{ \frac{-1}{\sqrt{N}}, \frac{1}{\sqrt{N}} \right\}^{N \times K}$$

$$s_k^T s_k = 1, s_i^T s_j = \rho_{ij}$$

$$W = diag(w_1, w_2, \ldots, w_K) \in R^{K \times K}$$

$$d = (d_1, d_2, \ldots, d_K)^T \in \{-1, 1\}^K$$

$$n \sim N\left(0, \frac{N_0}{2}\right)$$

In this instance, when a normalized signature sequence vector of a $k^{th}$ user is defined as $s_k$, a signal amplitude is defined as $w_k$, and a data symbol is defined as $d_k$, a receive signal r is found by addition of the product of a matrix S with each column including a user's signature sequence, a diagonal matrix W for representing each user's signal amplitude, a data symbol vector d, and a noise vector n. N and K respectively represent a processing gain and a total number of users.

A multi-user detection method for estimating another user's signal, canceling a regenerated signal component from the receive signal, and determining the corresponding user's symbol, is referred to as an interference cancellation method, which includes the SIC, the PIC, and the hybrid interference cancellation, a combination of the SIC and the PIC.

In the preferred embodiment of the present invention, an interference cancellation method is used in which a plurality of user signals is divided into a predetermined number of clusters, interference is cancelled from the user signals that belong to the same cluster by using the PIC method, and the SIC method is applied between the clusters.

The hybrid interference cancellation method is defined by the ICU (interference cancellation unit) that is a basic factor for a plurality of interference cancellation techniques.

Figure 1:
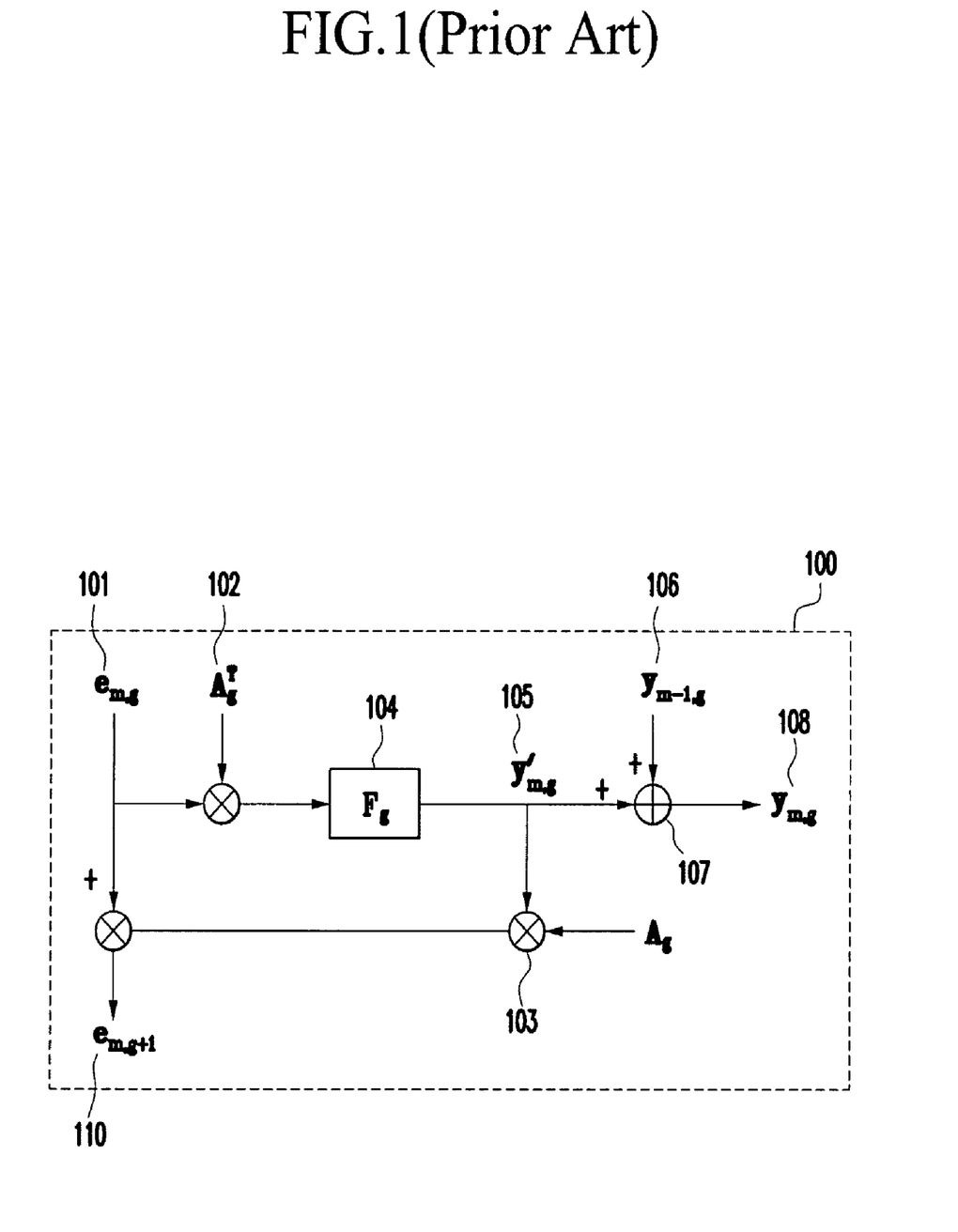
FIG. 1 shows an interference cancellation unit forming the general multi-stage hybrid interference canceller.

FIG. 1 shows an ICU 100 on the $g^{th}$ cluster in the $m^{th}$ stage.

In detail, the lower subscript in the $X_g$-type variable indicates a cluster factor, and the first lower subscript in the $X_{m,g}$-type variable is a factor for representing a stage while the second lower subscript is a factor for showing a cluster. An input is a residual signal component $e_{m,g}$ 101 obtained by canceling estimate signals of users who belong to a previous cluster from the receive signal. Signal estimation of a user who belongs to the current cluster is performed by a matched filter A T/g.

A transformation matrix $F_g$ 104 represents parallel interference cancellers of users who belong to a cluster. Signals of users from which interference is cancelled by the parallel interference canceller are given as $Y'_{m,g}$ 105, and as to decision on the signals of users within a cluster in each stage, soft decision 108 is performed on the addition 107 of $Y'_{m,g}$ to $Y_{m-1,g}$ 106 which is a result 104 of a previous stage.

When the parallel interference canceller 104 cancels the interference of the estimate signal, the signal reproducer 103 reproduces the interference-cancelled estimate signal and outputs an input signal $e_{m,g+1}$ 110 to be transmitted to a next cluster. The ICU for each cluster performs the same calculation as those described above.

Figure 2:
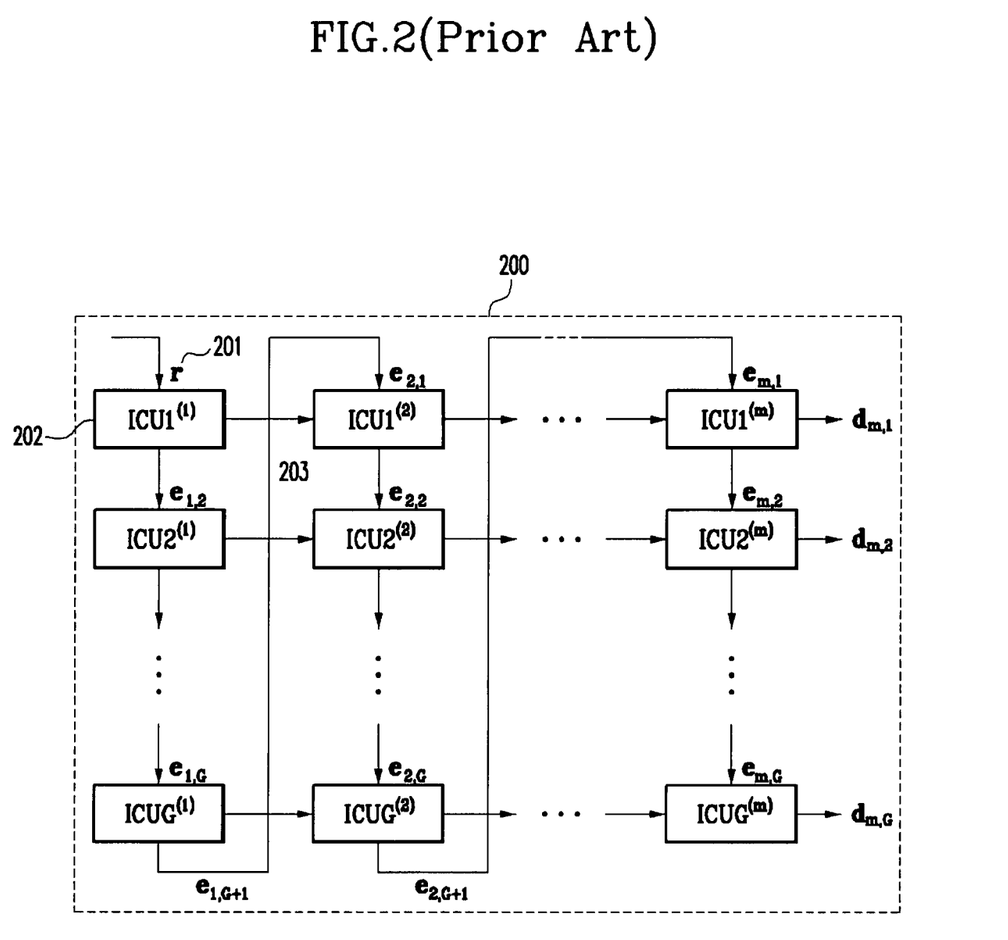
FIG. 2 shows a general multi-stage hybrid interference canceller.

FIG. 2 shows a whole block configuration of a multi-stage hybrid interference canceller 200 using an ICU 202 when the number of clusters is set as G.

When the number of users who belong to each cluster is 1, the multi-stage hybrid interference cancellation method is the same as general multi-stage successive interference cancellation methods, and when the number of users who belong to each cluster is matched with the number of the total users, the multi-stage hybrid interference cancellation method is the same as general multi-stage PIC methods.

When it is set that K users are assumed and the number of users for the respective cluster is identically u=K/G, the input signal $e_{1,1}$ 201 of the first ICU corresponds to the receive signal r, and the initial value transmitted from the previous stage is given as $y_{0,g}=0$ 203. When the matrix product in the descending order is defined as $$\coprod_{j=k}^{i} x_j = x_k x_{k-1} \ldots x_1,$$

input signals of each cluster and signal decision values on the users belonging to a cluster are given as follows.

$$e_{1,g} = \coprod_{j=k}^{l}(I - A_j F_j A_j^T)r = \Phi_{g-1} r \quad \text{Equation 2}$$

$$y_{1,g} = y'_{1,g} = F_g A_g^T e_{1,g} = F_g A_g^T \Phi_{g-1} r$$

$$F_g = \sum_{i=0}^{l}(I - A_g^T A_g)^i$$

Through the above-noted equation, the hybrid interference cancellation method in the first stage is to multiply the receive signal by a matrix that represents a linear filter. By using the equation, the decision values of all the clusters is given as follows.

$$y_1[y_{1,1}^T, y_{1,2}^T, \ldots, y_{1,G}^T]^T = G_1^T r \quad \text{Equation 3}$$

$$G_1 = [G_{1,1}, G_{1,2}, \ldots, G_{1,G}]$$

$$G_{1,g} = [F_g A_g^T \Phi_{g-1}]^T$$

The same process as the first stage is repeated in the upper stage. Since the residual signals that have passed through the first stage repeat the same process in the upper stage, the signal decision values 201 in the respective ICUs represent estimates of residual signal components of users, and the ICU cancels the components. Therefore, the signal decision value in the upper stage is given as a sum of a decision value of a previous stage and a decision value calculated in the current stage. Outputs of the $g^{th}$ cluster in the $m^{th}$ stage are given in Equation 4.

$$e_{m,g} = \Phi_{g-1} \Phi_G^{m-1} r \quad \text{Equation 4}$$

$$y_{m,g} = y'_{m,g} + y_{m-1,g} = F_g A_g^T \Phi_{g-1} \sum_{i=0}^{m-1} \Phi_G^i r$$

Equation 5 below shows decision values of all the clusters in the $m^{th}$ stage. From the result of Equation 5, the hybrid interference cancellation process uses the users' signature sequence information and cluster information to configure a linear filter, and determine the respective users' signals through linear filtering of the receive signal.

$$y_m = G_m^T r \quad \text{Equation 5}$$

$$G_m = [G_{m,1}, G_{m,2}, \ldots, G_{m,g}]$$

$$G_{m,g} = \sum_{i=0}^{m-1}(\Phi_G^T)^i \Phi_{g-1}^T A_g F_g^T$$

When the users' signal powers are different in the case that the power control for inducing the interference cancellation method according to the preferred embodiment of the present invention is not complete, the influence of the differences are considered.

First, influences that the differences of the users' signals powers give to the performance when the power control in the parallel interference canceller that is an interference canceller within each cluster of the hybrid interference canceller are considered, and through this consideration, the influences that the differences of the signal power of users belonging to a cluster give to the performance in the hybrid interference cancellation method are considered.

The PIC method for soft decision can be represented in the same format as a linear filtering process on a receive signal. Detector outputs of the PIC method is given in Equation 6.

$$y = G^T r = \left(\sum_{i=1}^{2}(I - S^T S)^{i-1} S^T\right) r \quad \text{Equation 6}$$

Equation 6 can be rewritten as Equation 7 with respect to an output $y_k$ of the $k^{th}$ user. The first term is a signal of the $k^{th}$ user, the second term is other users' residual interference components after the interference cancellation, and other terms are linearly-filtered noise. The SINR (signal to interference and noise ratio) of the $k^{th}$ user is expressed in Equation 8.

$$y_k = \left(s_k^T - \sum_{i=0, i \neq k}^{K} \rho_{ki} s_i^T\right)\left(w_k d_k s_k + \sum_{j=0, j \neq k}^{K} w_j d_j s_j + n\right) \quad \text{Equation 7}$$

$$= w_k d_k \left(1 - \sum_{i=0, i \neq k}^{K} \rho_{ki}^2\right) + \left(\sum_{j=0, j \neq k}^{K} w_j d_j \rho_{kj} - \right.$$

$$\left. \sum_{j=0, j \neq k}^{K} w_j d_j \left(\sum_{i=0, i \neq k}^{K} w_j \rho_{kj} \rho_{ij}\right)\right) + \left(s_k^T - \sum_{i=0, i \neq k}^{K} \rho_{ki} s_i^T\right) n$$

$$SINR_k = \frac{E\left[\left(w_k d_k \left(1 - \sum_{i=0, i \neq k}^{K} \rho_{ki}^2\right)\right)^2\right]}{E\left[\left(\sum_{j=0, j \neq k}^{K} w_j d_j \rho_{kj} - \sum_{j=0, j \neq k}^{K} w_j d_j \left(\sum_{i=0, i \neq k}^{K} \rho_{kj} \rho_{ij}\right)\right) + \left(s_k^T - \sum_{i=0, i \neq k}^{K} \rho_{ki} s_i^T\right) n\right)^2\right]} \quad \text{Equation 8}$$

If assuming a BPSK modulation, Equation 8 is given as Equation 9.

$$E\left[\left(w_k d_k\left(1 - \sum_{i=0,i\neq k}^{K} \rho_{ki}^2\right)\right)^2\right] = w_k^2\left(1 - \sum_{i=0,i\neq k}^{K} \rho_{ki}^2\right)^2 \quad \text{Equation 9}$$

Since the signal and the noise are independent and the user signals are also independent in the denomination for representing other users' residual interference and noise power, Equation 10 is given.

$$\sum_{i=0,i\neq k}^{K} w_i^2\left(\rho_{ki} - \sum_{j=0,j\neq k}^{K} \rho_{kj}\rho_{ij}\right)^2 +$$

$$\sigma^2\left(1 - 2\sum_{i=0,i\neq k}^{K} \rho_{ki}^2 + \sum_{i=0,i\neq k}^{K}\sum_{j=0,j\neq k}^{K} \rho_{ki}\rho_{kj}\rho_{ij}\right) \quad \text{Equation 10}$$

Rewriting of Equation 8 with Equations 9 and 10 gives rise to Equation 11.

$$SINR_k = \frac{\left(1 - \sum_{i=0,i\neq k}^{K} \rho_{ki}^2\right)^2}{\sum_{i=0,i\neq k}^{K} \frac{w_i^2}{w_k^2}\alpha_i^2 + \frac{\sigma^2}{w_k^2}\gamma} \quad \text{Equation 11}$$

$$\alpha_i = \rho_{ki} - \sum_{j=0,j\neq k}^{K} \rho_{kj}\rho_{ij}$$

$$\gamma = 1 - 2\sum_{i=0,i\neq k}^{K} \rho_{ki}^2 + \sum_{i=0,i\neq k}^{K}\sum_{j=0,j\neq k}^{K} \rho_{ki}\rho_{kj}\rho_{ij}$$

To present differences between average signal powers and users' signal powers, an average signal amplitude $\overline{w}$ and a user signal amplitude $w_k$ are defined as follows.

$$w_k = \overline{w} + \delta_k, \; w_1 \geq w_2 \geq \ldots \geq w_K \quad \text{Equation 12}$$

It is assumed that the cross correlation between the signature sequences is selected to provide no influence to the SINR. Summation of power ratios of the $k^{th}$ user and other users in the denomination of the SINR is given in Equation 13.

$$\sum_{i\neq k}^{K}\left(\frac{w_i}{w_k}\right)^2 = \frac{1}{w_k^2}\left\{(K-1)\overline{w} + \sum_{i=0,i\neq k}^{K} \delta_i^2 - 2\overline{w}\delta_k\right\} \quad \text{Equation 13}$$

The SINR of Equation 11 is in inverse proportion to the square of the difference with the average signal, and accordingly, as the difference between the users' signal amplitudes and the average signal amplitude becomes greater in the PIC method, the SINR lowers. Therefore, the performance of the PIC method is excellent when the power control is complete.

In the hybrid interference canceller that sets the number of users belonging to each cluster as u, the intensity difference of the user signals belonging to the $g^{th}$ cluster considers the SINR.

When the total user signals are arranged in the descending sequence, and the users are divided into G clusters, the users in the $g^{th}$ cluster are given as Equation 14.

$$u = \frac{K}{G}, \; w_1 \geq w_2 \geq \ldots w_K, \; u(g-1) + 1 \leq k \leq ug \quad \text{Equation 14}$$

Since the ICU of the $g^{th}$ cluster is represented as a linear filter, the output value of the linear filter in the $g^{th}$ cluster is provided as Equation 15 in the similar manner of the PIC method.

$$y_g = G_g^T e_g = \left(\sum_{i=1}^{2}(I - A_g^T A_g)^{i-1} A_g^T\right) e_g \quad \text{Equation 15}$$

Differences with the parallel interference canceller are that the residual receive signals $e_g$ other than the receive signal r are input, and the matrix $A_g$ of the users' signature sequences belong to a cluster other than the matrix S of the total signature sequences. Therefore, the decision value of the $k^{th}$ user in the $g^{th}$ cluster can be determined in the same manner of the parallel interference canceller, and the calculation of the SINR in the like manner of Equation 11 gives rise to Equation 16.

$$SNIR_k = \frac{\left(1 - \sum_{i=u(g-1)+1,i\neq k}^{ug} \rho_{ki}^2\right)^2}{\sum_{i=u(g-1)+1,i\neq k}^{ug} \frac{w_i^2}{w_k^2}\tilde{\alpha}_i^2 + \sum_{i=ug+1}^{K} \frac{w_i^2}{w_k^2}\tilde{\alpha}_i^2 + \frac{\sigma^2}{w_k^2}\tilde{\gamma}} \quad \text{Equation 16}$$

$$\tilde{\alpha}_i = \rho_{ki} - \sum_{j=u(g-1)+1,i\neq k}^{ug} \rho_{kj}\rho_{ij}$$

$$\tilde{\gamma} = 1 - 2\sum_{i=u(g-1)+1,i\neq k}^{ug} \rho_{ki}^2 + \sum_{i=u(g-1)+1,i\neq k}^{ug}\sum_{j=u(g-1)+1,j\neq k}^{ug} \rho_{ki}\rho_{kj}\rho_{ij}$$

Equation 16 has the same format as Equation 11 in the SINR of the PIC method, but it is different from Equation 11 in that the interference signal power includes components of other users belonging to the $g^{th}$ cluster and users belonging to the next one of the $g^{th}$ cluster.

By considering the influence caused by the difference of the user signal power in the $g^{th}$ cluster, the hybrid interference cancellation method is in inverse proportion to the power ratios of the users belonging to the identical cluster in the same manner as the PIC method.

When defining the user signal intensity of the $g^{th}$ cluster with a difference between the user signal intensities and a mean amplitude, the power ratio of users belonging to the same $g^{th}$ cluster is given as Equation 17.

$$\sum_{i=u(g-1)+1,i\neq k}^{ug}\left(\frac{w_i}{w_k}\right)^2 =$$

$$\frac{1}{w_k^2}\left\{(u-1)\overline{w}_g + \sum_{i=u(g-1)+1,i\neq k}^{ug} \delta_{gi}^2 - 2\overline{w}_g\delta_{gi}\right\} \quad \text{Equation 17}$$

Equation 17 shows that the SINR decreases as the difference of the signal powers of users who belong to the same cluster increases. In the same manner, other clusters can be represented using the average power intensity for each cluster and the difference of the average power.

Equation 17 is expressed by summation of the signals of the respective clusters, and in this instance, since the signals of the respective clusters can be represented with the average and corresponding difference of the signals of the respective clusters, the SINR reduces when the difference from the average of the signals of the clusters is greater.

Therefore, it is required to form a cluster in the hybrid interference cancellation method so as to provide a lesser difference of the signals of the users belonging to each cluster.

That is, it can be obtained from the above-noted consideration that the hybrid interference cancellation method provides better performance as the difference of the signals of the users belonging to the identical cluster decreases.

The hybrid interference cancellation method generates clusters with no consideration of the signal intensities of the users so that each cluster may have the identical number of users, and controls the interference, and when the power control is not complete, the signal intensities of the users become different, and hence, when the difference of the signal intensities of the users is big, the overall performance deteriorates.

Therefore, when the power control is not complete, the performance can be improved by forming a cluster in consideration of the signal intensities of the users, and canceling the interference.

Figure 3:
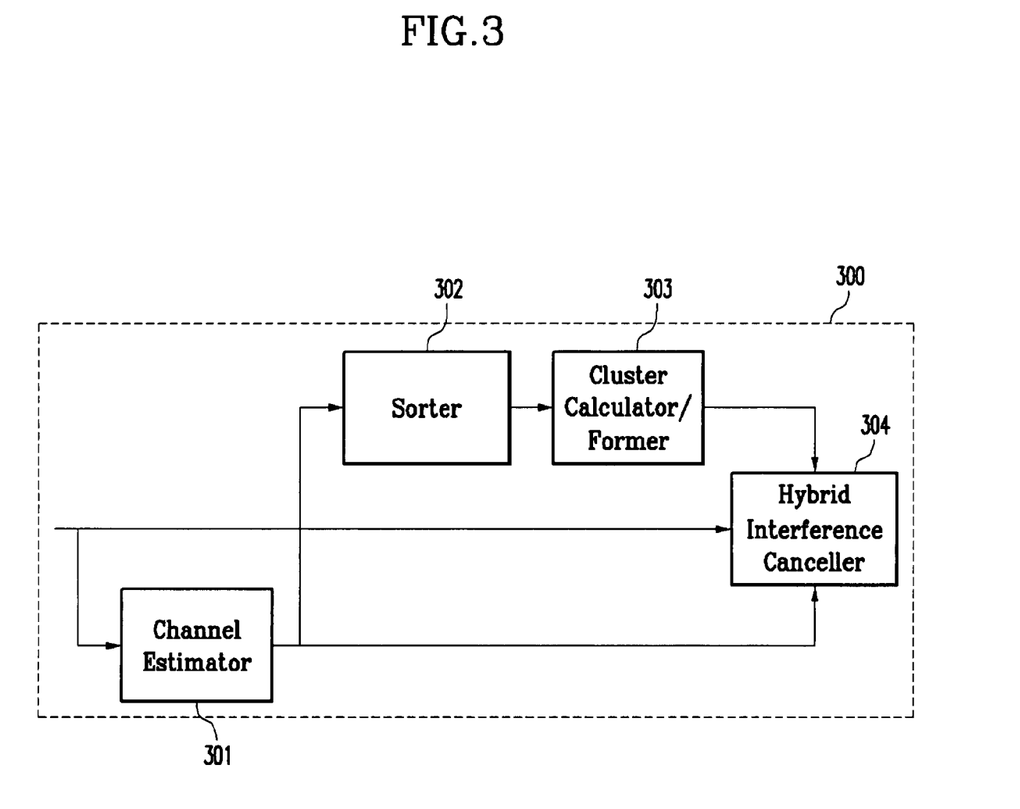
FIG. 3 shows a configuration of a hybrid multi-user interference canceller according to a preferred embodiment of the present invention.

The configuration of the interference canceller according to the preferred embodiment of the present invention has a configuration with cluster division. FIG. 3 shows an exemplified case of this interference canceller.

FIG. 3 shows a configuration of a hybrid multi-user interference canceller according to a preferred embodiment of the present invention, and a clustering module calculates elements of respective clusters, and sends them to the interference canceller.

Referring to FIG. 3, the hybrid multi-user interference canceller 300 comprises a channel estimator 301, a sorter 302, a cluster calculator/former 303, and a hybrid interference canceller 304.

In detail, the channel estimator 301 distinguishes respective user signals from a plurality of external receive signals, and respectively calculates the power of the distinguished user signals. In this instance, the channel estimator 301 attaches a predetermined order to the user signals in the order of 1, 2, 3, . . . , N so as to indicate the distinguished user signals.

The sorter 302 sorts the respective calculated user signal powers in descending order from the signal of biggest power with the number of 1, 2, . . . , 3, N.

The cluster calculator/former 303 uses the respective numbers following the user power in descending order to form at least one cluster using the K-average clustering method on a dynamic programming basis. In this instance, the difference of the power intensities of the respective signals of users who belong to the identical cluster is required to be minimized so as to prevent lowering of system performance.

Dynamic programming is a method for solving the optimization method of path-finding at a minimum cost, and it is generally used with methods for distributing insufficient resources to a predetermined number of users at a minimum cost. One of the commonest applications is a Viterby decoding method of convolutional codes. This dynamic programming represents a method for finding a path with the minimum cost when passing through paths defined in a trellis and nodes that connect the paths. A path with the minimum cost is selected from among branches that meet on each node, and this selection is progressed to thereby find a line of paths that are the least costly.

That is, the optimized path is found through the dynamic programming, and a cluster is formed using the numbers written in the states included in the optimized path. For example, when the results of 1, 4, 7, 10, and 12 are obtained, it indicates that five clusters are formed, and the numbers in the results respectively represent the last user in the corresponding cluster.

Therefore, the first group forms a cluster with a user with the biggest signal power, the second group forms a cluster with three users with the second, third, and fourth biggest signal powers, the third group forms a cluster with three users with the fifth, sixth, and seventh biggest signal powers, the fourth group forms a cluster with three users with the eighth, ninth, and tenth biggest signal powers, and the fifth groups forms a cluster with two users with the eleventh and twelfth biggest signal powers.

The hybrid interference canceller 304 cancels the interference of the user signals in the same cluster using the PIC, and cancels the interference between the user using the SIC between the respective clusters.

An operation of the cluster calculator/former 303 from among the major operations of the hybrid multi-user interference canceller will now be described in detail with reference to drawings.

Figure 4:
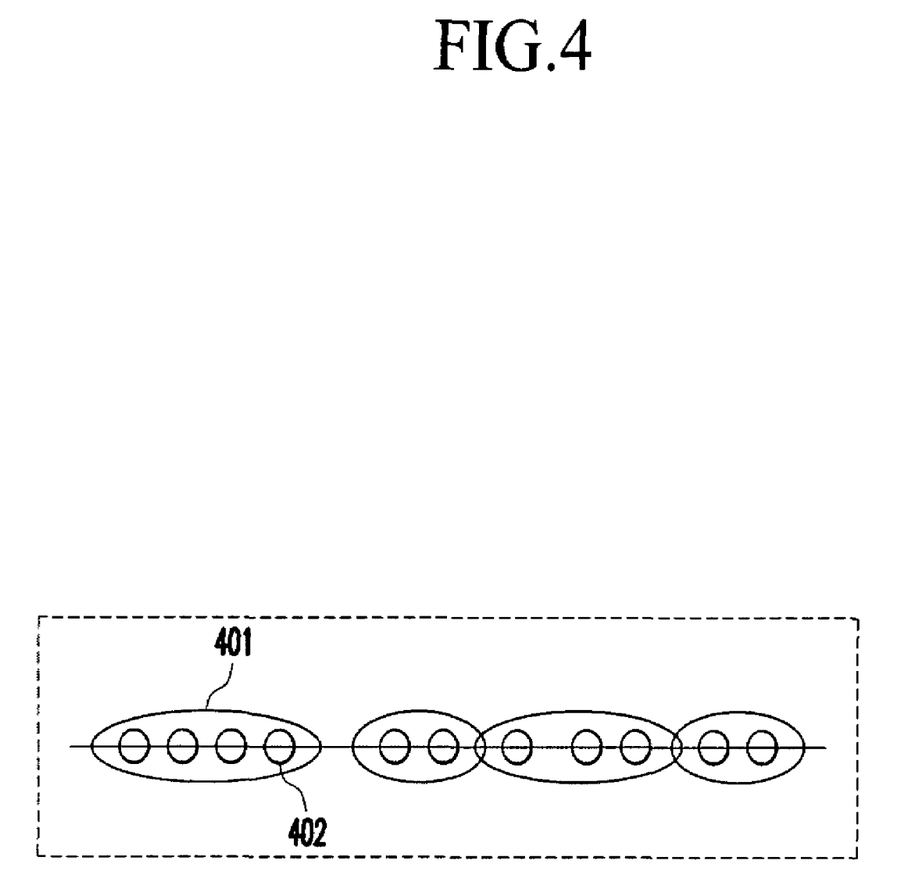
FIG. 4 shows a clustering method on the dynamic programming basis according to a preferred embodiment of the present invention.

The K-average clustering method is an optimization method for generating a cluster 401 so that the elements 402 (signal power intensities) belonging to each cluster may differ less from a central value or a mean value, FIG. 4 showing an exemplified case thereof.

FIG. 4 shows a diagram for the clustering method on the dynamic programming basis according to a preferred embodiment of the present invention.

First, when an object function is calculated with the sum of squared errors, and a set S including n samples of $-X_1$, $X_2$, . . . , $x_n$ is divided into K subsets $s_1$, $s_2$, . . . , $s_k$, if $n_i$ is a number of samples of the subset $s_i$, and $m_i$ is a mean value of the samples belonging to the subset $s_i$, Equation 18 is provided.

$$m_i = \frac{1}{n_i} \sum_{x \in s_i} x \qquad \text{Equation 18}$$

The sum of squared errors is given as Equation 19.

$$J_e = \sum_{i=1}^{K} \sum_{x \in s_i} \|x - m_i\|^2 \qquad \text{Equation 19}$$

The mean value $m_i$ (i.e., a mean value of signal powers in the user sets) may be referred to as a representative or a central value of the given subset $s_i$ that is a number of user sets, in the meaning of minimizing Equation 19.

Therefore, the object function is calculated with summation of Euclidian distances from the central values of n samples. The object function is differentiated according to cluster dividing methods, and it is required to minimize the value of the object function so as to obtain the optimized division.

It is needed to consider all the division cases so as to achieve the optimal results when dividing the total set of n samples into K subsets, and the number of the cases is $K^n$.

Figure 5:
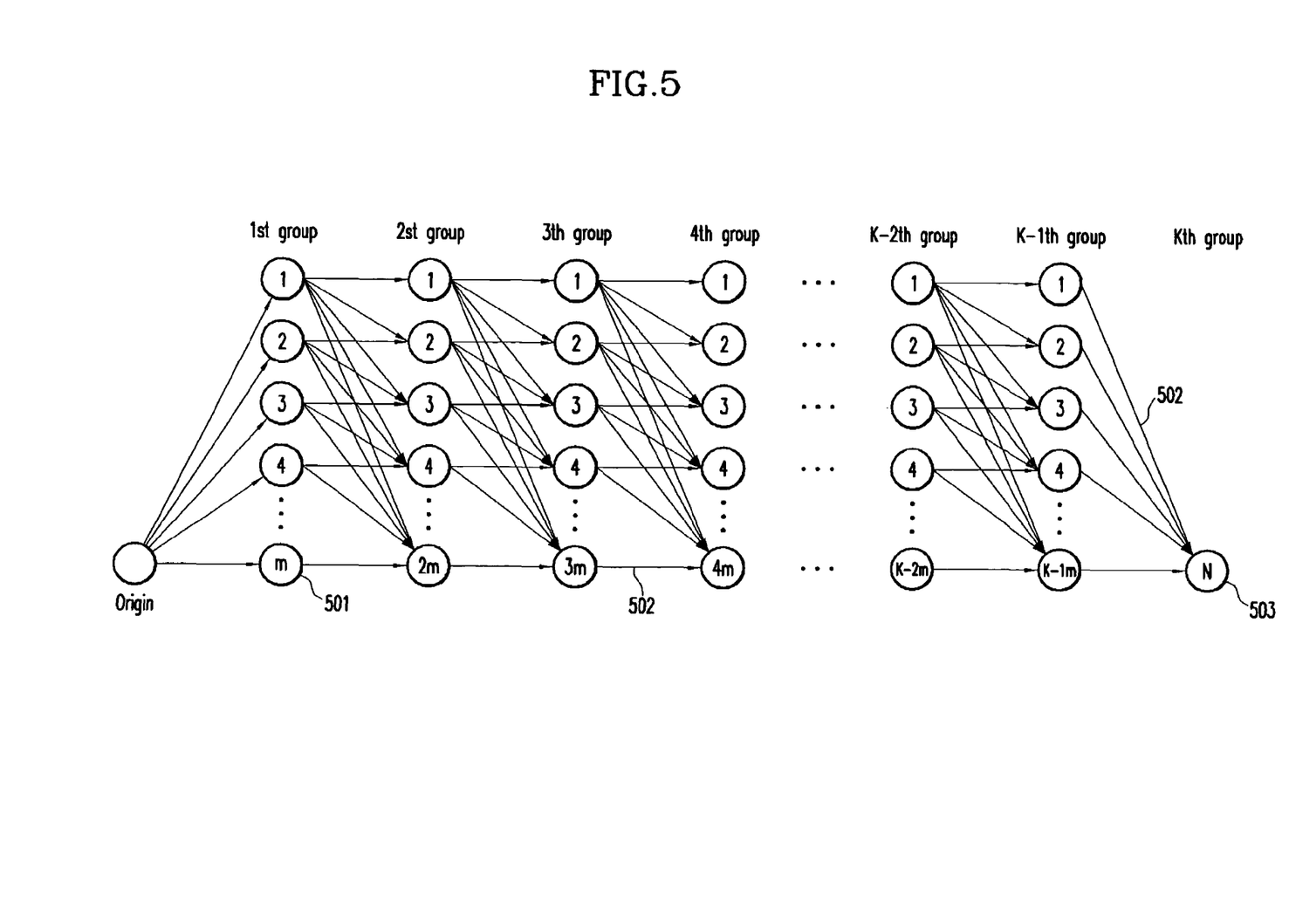
FIG. 5 shows a trellis diagram for calculating the clustering method when the number of clusters is established according to a preferred embodiment of the present invention.
Figure 6:
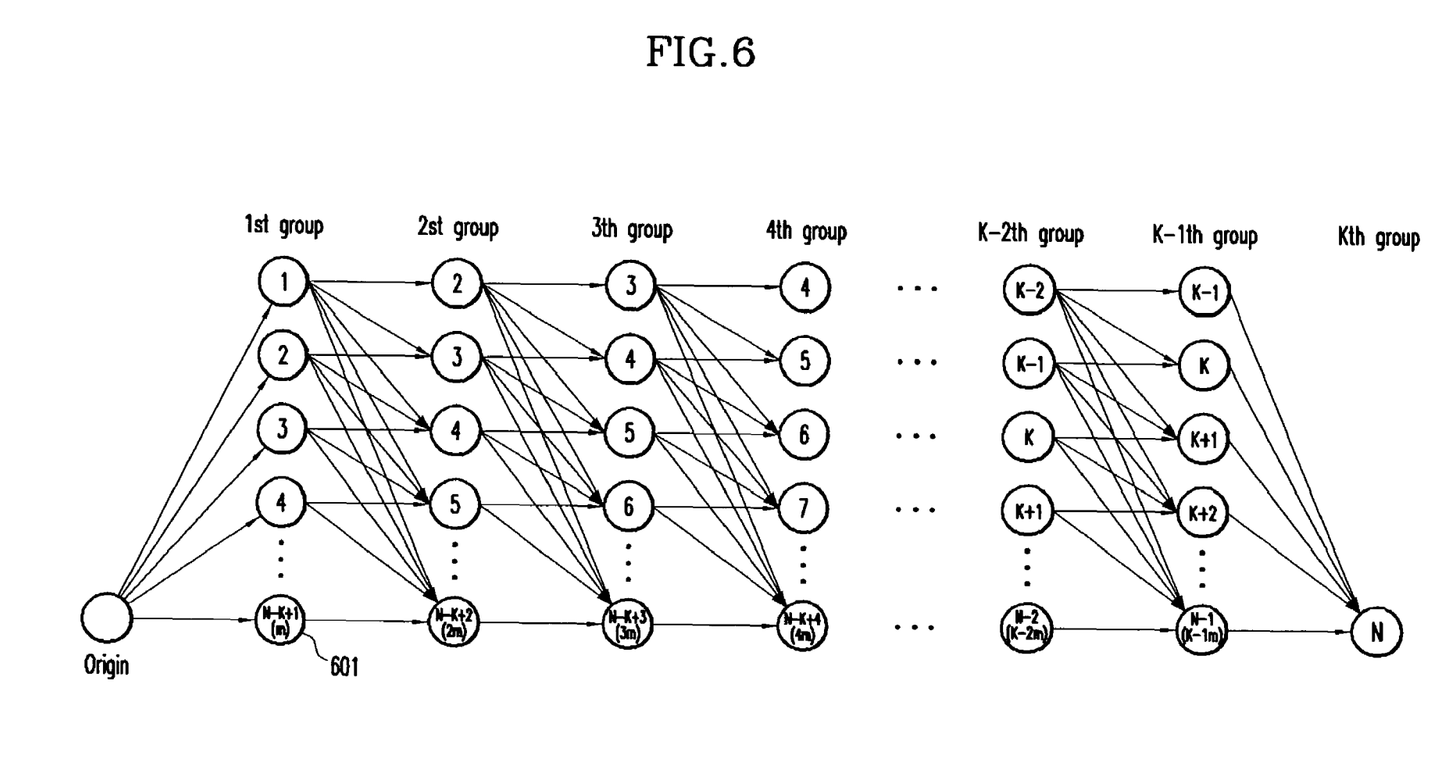
FIG. 6 shows a trellis diagram for calculating the clustering method when the number of clusters is not established according to a preferred embodiment of the present invention.

Since the cluster division corresponds to a cluster division in a predetermined order, the usage of dynamic programming allows obtaining of optimized cluster division without considering all the cases. In order to use the dynamic programming, it is initially required to configure a trellis. The method for configuring the trellis is classified as a case when the number of clusters is determined and a case when it is not. FIGS. 5 and 6 show trellis configuration methods.

FIG. 5 shows a trellis configuration when the number of clusters is determined. As shown, the trellis comprises nodes 501 and branches 502.

In the trellis configuration, the number of users is sorted in descending order by the channel estimator 301 and the sorter 302 according to the power intensities of receive signals.

The nodes including the sorted number of users are two-dimensional, each column represents each cluster, and row-directional elements of each column represent the number of the last user that the cluster of the corresponding column has as an element. The number of each row represents a number of users that the corresponding cluster has as the last element.

Therefore, when the number of each row is restricted to be m, the maximum number of users which can be assigned to a single cluster can be specified. Accordingly, the number provided to each node is matched with the number of all users allocated to the current cluster.

For example, the first row in the first column represents that the element in the first cluster is one. Since all the clusters are required to include at least one element, the number provided to the node in the second row starts from 2. Also, since a user who belongs to one cluster cannot belong to the next cluster, when the branch is connected to the next column, the branch is always connected to the very next one, horizontally or vertically. After the determination of the $k^{th}$ cluster, all the branches are to be converged to a single node.

That is, the residual users are all allocated to the last cluster so that no unallocated elements may remain, and the dynamic programming is executed on the given trellis. The clusters are configured from the numbers provided to the start node and the arrival node when moving along the respective branches from the left to the right in the trellis. That is, the users of from a user who has a number added by 1 from the number provided to the node to a user who has a number provided to the arrival node are set as a single cluster, and a mean power of the corresponding cluster is calculated and defined to be an object function of the branch.

The sum of all object functions that the branches that have met on a predetermined node have received on the respective paths in the trellis is calculated at the respective nodes, and the sum of all the calculations is then defined as an object function of the paths.

When a plurality of branches arrives at the predetermined node, a branch that has the least object function is selected, and other branches are discarded. This process is repeatedly executed at all nodes in the same column.

After execution of this process, the nodes of the respective columns uses a cluster allocation method for minimizing the summation of calculation results of Equation 19 at the time of the arrival at the node. When this process is repeated K times for each column, K clusters are assigned to each node in the final $K^{th}$ column. The minimum object function is selected from the final $K^{th}$ cluster 503 to find an optimal path, and the numbers provided to the nodes through which the optimal path has passed. Since the numbers represent the numbers of last elements in the respective clusters, elements having numbers of from the number after the number of the last element in the prior cluster to the number of the last element in the corresponding cluster are collected and established as the elements of the corresponding cluster. Since the optimal path has K values, K clusters can be determined by repeating this method, and the clustering is terminated by dividing the respective users into the clusters.

Next, the elements of the cluster can be assigned by determining the number of clusters when the number of clusters is not determined. To use this method, a trellis of FIG. 6 is defined.

Differing from FIG. 5, the node 601 is assigned with the same number in the row direction, representing that a cluster without elements is allowed from among the clusters. Finally allocated clusters can be obtained by excluding the cluster without elements when the cluster allocation is finished.

After this, the hybrid interference canceller 304 performs hybrid interference cancellation on at least one cluster through the above-noted method to prevent deterioration of the whole detection performance.

As described above, the clusters of users to be processed by the default ICU of the hybrid interference canceller are divided using the clustering method on the dynamic programming basis to thereby improve processing performance of the default ICU.

Further, when the power control is not complete, the performance may be worsened because of big differences between the signal intensities of the users who belong to the same cluster, and hence, it is required to add the clustering process before using the hybrid interference cancellation. However, since it is relatively easy to calculate the object function for the dynamic programming, the cost of additional hardware is rarely needed. Therefore, the clustering method can be easily realized in a software manner.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A hybrid multi-user interference cancellation method for canceling interference between a plurality of user signals, comprising:
   (a) receiving a plurality of external user signals, calculating powers of the user signals, and providing user numbers to the calculated signal powers in their intensity orders;
   (b) sorting the user numbers in descending order;
   (c) forming at least one user cluster so that the signal powers following the sorted user numbers may differ less from a central value or a mean value in the same cluster; and
   (d) performing parallel interference cancellation on the respective user signals within the same cluster, and performing successive interference cancellation between the formed clusters;
   wherein said forming comprises:
   configuring a trellis including nodes and branches, the sorted user numbers being provided to the nodes; and forming at least one user cluster including at least one user number from a start node to an arrival node moving along the branches of the trellis.

2. The method of claim 1, wherein forming at least one user cluster comprises: forming the user numbers of from the user number generated by adding 1 to the user number provided to the start node to the user number provided to the arrival node, into a single cluster.

3. The method of claim 2, wherein (c) comprises:
calculating an average signal power of the formed user clusters to define an object function of each branch;
calculating the sum of all object functions received from at least one path for each branch, by the branches that have met at a predetermined node;
selecting the branch with the least sum of the calculated object functions as the optimal path; and
collecting the numbers provided to the respective nodes in the selected optimal path to form a user cluster.

4. The method of claim 3, wherein the defined object function satisfies the subsequent equation $$J_e = \sum_{i=1}^{K} \sum_{x \in s_i} \|x - m_i\|^2$$

where $s_i$ is a number of user sets, and $m_i$ is a mean signal power value in the user set.

5. The method of claim 1, wherein (c) comprises:
configuring a trellis including nodes and branches, the sorted user numbers being provided to the nodes; and
forming at least one user cluster that includes no user numbers from a start node to an arrival node moving along the branches of the trellis.

6. The method of claim 5, wherein (c) comprises:
excluding the user cluster without user numbers, when selecting the optimal path by using the formed user cluster.

7. A hybrid multi-user interference canceller for canceling interference between a plurality of user signals, comprising:
a channel estimator for receiving a plurality of external user signals, calculating powers of the user signals, and numbering the calculated signal powers in their intensity orders;
a sorter for sorting the user numbers in descending order;
a cluster calculator/former for forming at least one user cluster so that the signal powers following the sorted user numbers may differ less from a central value or a mean value in the same cluster; and
a hybrid interference canceller for performing parallel interference cancellation on the respective user signals within the same cluster, and performing successive interference cancellation between the formed clusters;
wherein the cluster calculator/former configures a trellis including nodes and branches, the sorted user numbers being provided to the nodes; and
forms at least one user cluster including at least one user number from a start node to an arrival node moving along the branches of the trellis.

8. The canceller of claim 7 wherein the cluster calculator/former forms the user numbers of from the user number generated by adding 1 to the user number provided to the start node to the user number provided to the arrival node, into a single cluster.

9. The canceller of claim 8, wherein the cluster calculator/former calculates an average signal power of the formed user clusters to define an object function of each branch, and allows the branches that have met on a predetermined node to calculate the sum of all the object functions provided from at least one path for each branch.

10. The canceller of claim 9, wherein the cluster calculator/former selects the branch with the least sum of the calculated object functions as the optimal path, and collects the numbers provided to the respective nodes in the selected optimal path to form a user cluster.

11. The canceller of claim 7, wherein the cluster calculator/former configures a trellis including nodes and branches, the sorted user numbers being provided to the nodes, and forms at least one user cluster that includes no user numbers from a start node to an arrival node moving along the branches of the trellis.

12. The canceller of claim 11, wherein the cluster calculator/former excludes the user cluster without user numbers, when selecting the optimal path by using the formed user cluster.

13. A computer readable medium storing a program for performing a hybrid multi-user interference cancellation method for canceling interference between a plurality of user signals, comprising:
(a) receiving a plurality of external user signals, calculating powers of the user signals, and numbering the calculated signal powers in their intensity orders;
(b) sorting the user numbers in descending order;
(c) forming at least one user cluster so that the signal powers following the sorted user numbers may differ less from a central value or a mean value in the same cluster; and
(d) performing parallel interference cancellation on the respective user signals within the same cluster, and performing successive interference cancellation between the formed clusters;
wherein said forming comprises:
configuring a trellis including nodes and branches, the sorted user numbers being provided to the nodes; and
forming at least one user cluster including at least one user number from a start node to an arrival node moving along the branches of the trellis.

* * * * *